United States Patent [19]

Hecht et al.

[11] Patent Number: 5,750,058
[45] Date of Patent: May 12, 1998

[54] METHOD FOR THE PREPARATION OF HIGH MODULUS CARBON AND GRAPHITE ARTICLES

[75] Inventors: Daniel H. Hecht, Duluth; David A. Schulz, Flowery Branch, both of Ga.

[73] Assignee: Amoco Corporation, Chicago, Ill.

[21] Appl. No.: 677,688

[22] Filed: Jul. 8, 1996

Related U.S. Application Data

[62] Division of Ser. No. 355,514, Dec. 14, 1994, Pat. No. 5,552,008, which is a division of Ser. No. 76,538, Jun. 14, 1993, abandoned.

[51] Int. Cl.$^6$ .................................................. C01B 31/00
[52] U.S. Cl. ................................................ 264/29.6
[58] Field of Search .............................. 264/29.6, 29.1

[56] References Cited

U.S. PATENT DOCUMENTS

| | | | |
|---|---|---|---|
| 3,974,264 | 8/1976 | McHenry | 423/447.4 |
| 4,026,788 | 5/1977 | McHenry | 208/39 |
| 4,032,607 | 6/1977 | Schulz | 264/29.3 |
| 4,178,413 | 12/1979 | DeMunda | 428/408 |
| 4,209,500 | 6/1980 | Chwastiak | 423/447.6 |
| 4,350,672 | 9/1982 | Layden, Jr. et al. | 423/445 |
| 4,534,950 | 8/1985 | Uemura et al. | 423/447.4 |
| 4,686,096 | 8/1987 | Schulz et al. | 423/447.1 |
| 4,777,093 | 10/1988 | Nelson et al. | 428/408 |
| 4,849,200 | 7/1989 | Uemura et al. | 423/447.4 |
| 5,035,942 | 7/1991 | Nagata et al. | 428/288 |
| 5,266,294 | 11/1993 | Schulz et al. | 423/447.1 |
| 5,292,408 | 3/1994 | Tanigawa et al. | 204/129.1 |
| 5,552,008 | 9/1996 | Hecht et al. | 156/174 |

OTHER PUBLICATIONS

Thomas, C.R. ed. "Essentials of Carbon–Carbon Composites," 2–5, 73–75, 78, 88, 144–151 (1993).

Delmonte, John. "Technology of Carbon and Graphite Fiber Composites," 212–213 (1981).

*Primary Examiner*—Christopher A. Fiorilla
*Attorney, Agent, or Firm*—Richard J. Schlott; Stephen L. Hensley

[57] ABSTRACT

Self-reinforcing, pitch-based carbon articles having a unique combination of excellent thermal conductivity and outstanding mechanical properties are produced by carbonizing an acid-treated, mesophase pitch fiber preform. The carbon articles having varying degrees of porosity are particularly desirable for use in thermal management and stiffness applications, and in carbon vapor infiltration processes employed in making complex solid carbon articles.

6 Claims, No Drawings

METHOD FOR THE PREPARATION OF HIGH MODULUS CARBON AND GRAPHITE ARTICLES

CROSS REFERENCE TO RELATED APPLICATIONS

This application is a Division of U.S. application Ser. No. 08/355,514, filed Dec. 14, 1994, now U.S. Pat. No. 5,552,008, which was a Division of U.S. application Ser. No. 08/076,538, filed Jun. 14, 1993, now abandoned.

BACKGROUND OF THE INVENTION

This invention relates to articles comprising graphite and more particularly to methods for making high tensile modulus compositions comprising highly oriented graphite.

Carbon structures are widely used for applications where high temperatures will be encountered and where heat dissipation is important such as, for example, in high energy brake pads and in consumer electronic devices as electronic heat sinks. While a good balance of mechanical properties continues to be important in such demanding applications, high thermal conductivity and good dimensional stability have become particularly important considerations. The thermal conductivity and dimensional stability of solid carbon depends largely on its structure. Characteristically, these properties improve as the crystallinity and density of the carbon increases. Solid amorphous carbon may typically have a density near 1.2 g/cc and a thermal conductivity as low as 100 w/m-°K, while single crystal graphite has a density of about 2.26 g/cc, a thermal conductivity near 1800 w/m-°K—considerably greater than the conductivity of copper—and, unlike metals, a negative coefficient of thermal expansion. These characteristics are highly desired by users of carbon articles, and the art has expended considerable effort seeking methods for producing carbon structures with such high densities reproducibly and with good control.

Highly ordered pyrolytic graphites having densities near 2.2 g/cc and good thermal conductivity have been produced by vapor deposition of carbon. Highly oriented pyrolytic graphite (HOPG) may have a thermal conductivity on the order of 800 w/m-°K. However, the HOPG materials are extremely fragile, too brittle even for measurement of mechanical properties such as tensile strength, and are extremely costly to produce. The process is extremely costly, and is capable only of producing very small, extremely fragile, wafer-like articles on the order of about one-half to one inch square. HOPG materials are thus severely limited in their application and have not found wide acceptance.

The bulk graphites widely used commercially for fabricating articles such as crucibles, electrodes and the like are largely amorphous and relatively low in density, and lack the high thermal conductivity of crystal graphite. To the extent particular bulk graphites may be crystalline, the crystalline component will comprise large, randomly-oriented graphitic crystallites, generally greater in size than about 30 to 50 microns, embedded in a substantially amorphous carbon phase. These lower-density bulk graphite articles will generally exhibit only a fraction of the bulk thermal conductivity that characterizes highly organized crystalline graphite. The degree of crystallinity in bulk graphite structures may be altered by optimizing a number of process factors including annealing and by the nature of the pitch employed. Mesophase or liquid crystal pitch may be readily transformed thermally into a more crystalline bulk graphite; however, bulk mesophase pitch is generally not oriented and, when processed in bulk into crystalline graphite, the crystallites also lack orientation. Although the density of these bulk graphite articles thus may be higher than for other forms of bulk carbon, the bulk thermal conductivity is considerably below that of crystal graphite.

Bulk graphites also lack the mechanical strength needed for more demanding thermal applications. Adding carbon or graphite fiber reinforcement directly to bulk pitch prior to thermal processing may afford modest improvement in mechanical properties. As with most composite materials, control of fiber reinforcement configuration through use of carbon fiber fabric or other structured preforms may permit further improvement in properties. Infiltrating a carbon fiber preform with pitch or vapor-deposited pyrolytic carbon to serve as binder and matrix, then carbonizing and graphitizing, will provide composites with improved mechanical properties. However, even with use of pressure consolidation, the articles will generally have densities below about 1.5 g/cc and correspondingly low thermal conductivities, generally below about 500 w/m-°K. In addition, infiltrating a preform with pitch or with a vapor-deposited carbon is difficult, time-consuming and expensive.

One widely-used method used for producing reinforced carbon articles has been to coat sheets of graphite cloth with a suitable binder, stack the sheets and heat the structure to carbonize the binder. In U.S. Pat. No. 4,178,413 a process is disclosed whereby a woven carbon fiber structure is formed, for example, from carbonized cloth of rayon or polyacrylonitrile (PAN), infiltrated with a vapor-deposited pyrolitic carbon to bond the substrate fiber, then impregnated with a carbonizable fiber, cured under pressure and finally carbonized. Five to ten cycles of impregnating and carbonizing are necessary to produce a carbon article having a density suitable for carbon brake use, disclosed therein as in the range of 1.5 to 1.85 g/cc. Such processes are extremely difficult to carry out without introducing variation in density, void formation and cracking.

An alternative to pitch infiltration processes, disclosed in U.S. Pat. No. 4,849,200, employs a preform constructed from an intimate combination of pitch fiber and a pitch-based carbon fiber reinforcement. When placed under an applied pressure of at least 10 kg/cm$^2$ and fully carbonized thermally, the pitch fiber component apparently melts and flows to supply the matrix component of the composite cementing the reinforcing fiber. The volume fraction of the fiber reinforcement in the resulting composite will generally be less than about 70 volume %, and the bulk density of the composites is seen to be generally less than about 1.7 g/cc.

Binderless processes involving thermal processing of a carbonized pitch fiber bundle are also known. These processes are ordinarily carried out using extreme pressures, externally-applied, to compact the structure and force the carbonized pitch to flow and cement the fiber bundle. For example, U.S. Pat. No. 4,032,607 discloses forming staple lengths of fiber by spinning a carbonaceous pitch, preferably by blow spinning, and depositing the fiber on a screen to form a web. The web is then heated in air to oxidize the fiber surfaces to an oxygen level of 1 to about 6 wt. %, which generally is sufficient to stabilize the fiber mat or felt without completely thermosetting the fiber and rendering the fiber infusible. Further heating in an inert atmosphere under pressure causes unoxidized pitch to flow and exude through defects in the fiber, providing a pitch matrix to bind the fiber. Carbonizing the structure provides a low-density carbon composite with a high degree of porosity.

As disclosed in U.S. Pat. No. 4,350,672, a preform made from acrylic fiber oxidized to a level of oxygen sufficient to render the fiber non-melting is first consolidated by applying heat and pressure and then carbonized and graphitized by heating in an inert gas atmosphere, providing a carbon body said to have a fibular microstructrure and to be porous, the level of porosity ranging from 2% for very high consolidation pressures to greater than 70% when lower consolidation pressures are employed. The consolidation step is characterized as causing individual fibers to bond together, with heat distortion flow increasing the contact area of the fibers and promoting bonding between contiguous fibers. These structures may be more appropriately described as porous, sintered, fibrous bodies.

In U.S. Pat. No. 4,777,093, there is disclosed a process wherein pre-oxidized PAN fiber having an oxygen content in the range of 9 to 14 wt. % is first subjected to a series of forming operations to produce lengths of densified tow having fiber density of up to about 75 to 80%, then infused with water or other suitable plasticiser to swell the fiber and leach low polymer from the fiber interior. The tow structure is then encapsulated with low temperature metal alloy and subjected to hot isotatic pressing at pressures as great as 15,000 psi. After first melting and removing the metal alloy, the resulting carbon body may then be graphitized by heating under inert atmosphere at temperatures as great as 2500°–3200° C. to have a density as great as 2.1 g/cc and a thermal conductivity in the range of 350–400 w/m-°K. Although the conductivity is generally higher than for graphitized PAN fiber, it is inadequate for most thermal applications. In addition, the rigidity of the graphitized structure is undesirably low, with modulus values for the graphitized body generally below $50 \times 10^6$ psi.

It is apparent that the processes heretofore available in the art for producing high density carbon articles are generally unsatisfactory. Most are very expensive to practice, requiring specialized equipment capable of achieving high pressures and temperatures, and may require inordinately long times, often on the order of months to complete, further adding to cost. Highly ordered graphites are generally brittle, while reinforced structures lack the necessary thermal properties. Generally, the better reinforced carbon articles known in the art have thermal conductivities less than about 300 w/m-°K, while most bulk graphites exhibit lower thermal conductivity, even as low as 50 w/m-°K. Such carbon articles also generally lack the highly desirable negative coefficient of thermal expansion characteristic of crystal graphite, and many also are deficient in mechanical properties, particularly tensile strength and rigidity.

The demand for carbon articles that combine high thermal conductivity, a desirable balance of mechanical properties including good tensile properties and high modulus, greater than $70 \times 10^6$ psi, and a negative coefficient of thermal expansion continues to grow. A high degree of dimensional stability, rigidity at high temperatures and excellent thermal conductivity are, in combination, increasingly important design requirements, and are particularly desired for applications where weight reduction is important, for example in consumer goods including electronic devices. Carbon structures exhibiting these highly desired properties and preferably with a high degree of anisotropy, that is, directed as desired along an axis of the structure, and a method for making such structures would be particularly useful and desirable for constructing heat sinks for electronic devices and in the design of brake materials for very high friction loads.

SUMMARY OF THE INVENTION

This invention is directed to a method for making carbon articles comprising a self-reinforcing, pitch-based carbon and possess a unique combination of excellent thermal conductivity and outstanding mechanical properties. The invented method comprises providing a mat of pitch-based fibers wet with a liquid oxidizer, fabricating the mat into a preform, and carbonizing the preform by a thermal treatment conducted in a substantially inert atmosphere carried to a final temperature above about 1100° C.

Carbon articles made by the method of this invention may exhibit, anisotropically, a thermal conductivity greater than 600 w/m-°K, a tensile strength greater than 10,000 psi and a modulus greater than $75 \times 10^6$ psi, together with a negative coefficient of expansion. The degree of anisotropy may be selectively controlled by modifying the overall degree of orientation, providing substantial capability for controlling thermal properties and dimensional stability characteristics when designing carbon structures for particular end uses without a concomitant sacrifice in strength. The carbon articles of this invention thus represent a considerable improvement over bulk graphite and reinforced carbon composites heretofore widely employed in the art.

DETAILED DESCRIPTION

Pitch-based carbon articles according to this invention are formed by carbonizing and graphitizing structures comprising mesophase pitch fiber treated with a suitable liquid oxidizer.

Pitch Fiber

The pitch-based continuous fiber suitable for use in constructing the preforms according to the invention are produced by spinning a high purity mesophase pitch. Among the pitches useful for these purposes are high purity mesophase pitches obtained from petroleum hydrocarbon or coal tar sources. Methods for preparing a suitable pitch include those disclosed in U.S. Pat. Nos. 3,974,264, 4,026,788, and 4,209,500, and any of these methods as well as the variety of solvent-based and pitch fractionation processes known in the art may be employed for these purposes. Several methods are known and used in the art to characterize the mesophase component of pitch, including solubility in particular solvents and degree of optical anisotropy. The mesophase pitch useful in the practice of this invention preferably comprises greater than 90 wt % mesophase, and preferably will be a substantially 100 wt. % mesophase pitch, as defined and described by the terminology and methods disclosed by S. Chwastiak et al in *Carbon* 19, 367–363 (1981). Suitable pitches also include pitches synthesized from other chemical substrates by a variety of well-known processes. For the purposes of this invention, the pitch will be thoroughly filtered to remove infusible particulate matter and other contaminants that may contribute to the formation of defects and flaws in the fiber.

The mesophase pitch is formed into filaments by being spun from the melt using conventional methods, and the filaments are gathered to form a yarn or tow. For the purposes of this discussion, fiber is intended to be understood as including all collected continuous multifilament structures or bundles, including yarn, tow, strand or the like. In general, the spinning is conducted by forcing the molten pitch through a spinnerette while maintaining the pitch at a temperature well above the softening temperature. However, the temperatures useful for spinning generally lie in a narrow range and will vary, depending in part upon the viscosity and other physical properties of the particular pitch being spun. Those skilled in the art of melt-spinning will recognize that even though the pitch may be in a molten state, it may be too viscous or may have insufficient strength in the melt to form a filament and may even decompose or de-volatilize to form voids and other flaws when the pitch temperature is outside the temperature range useful for spinning that pitch. Thus it has long been a necessary and standard practice in the art to conduct initial tests to establish the temperature range that will be effective for melt spinning the particular pitch being employed. For the purposes of this invention, the pitch will preferably be spun at or near the highest temperature within in the effective range of spinning temperatures at which the pitch may be spun.

It is desirable to obtain very high degrees of orientation of the filamentary mesophase domains within each filament. While not wishing to be bound by any particular theory of operation, it appears the degree of crystallization that may take place during the subsequent thermal carbonization steps to form microcrystalline graphite, as well as the size of the crystallites that may form, is related to size of the mesophase domains in the filaments of the pitch fiber and the degree of orientation of the mesophase domains. Pitch fibers having large, well-oriented mesophase domains tend to form fibers comprising larger, more compact filamentary graphitic microcrystals upon being carbonized. The size, particularly in length of the filamentary mesophase domains as determined by $L_c$, and the degree of domain orientation appear in turn to be determined at least in part by the conditions employed for spinning the pitch fiber as well as by the nature of the pitch.

It is well-known that pitch tends to polymerize when heated, and to coke, particularly when exposed to an oxidizing environment while hot. Polymerization may in turn increase the melt viscosity of the pitch, making spinning difficult or impossible, while coking of the pitch forms infusible particles that contribute to flaws in the fiber and may block the spinnerette. The spinning process will therefore preferably be conducted using melting and heating operations designed and optimized to protect the molten pitch from exposure to air or other oxidizing conditions during the spinning operations, and to minimize the time the pitch is exposed to elevated temperatures.

Pitch fiber as spun is extremely soft and fragile and is thermoplastic, the filaments within the yarn readily undergoing creep and flow and becoming fused. Treatment of the pitch fiber with a liquid oxidizer such as aqueous nitric acid serves to modify the filament surfaces and to supply some lubrication as well, providing sufficient damage tolerance to permit the fiber to be handled and fabricated. The concentration of nitric acid needed will depend in part upon the length of time the pitch will be in contact with the acid. A concentration of as low as 5 wt. % may be found effective for some purposes, particularly with extended exposure times, and substantially higher concentrations, as high as 35 wt. % and more, may also be found useful. However, treatment using high concentrations of nitric acid is more difficult to control, and may render the pitch fiber thoroughly intractable and unsuited for use in the practice of this invention. Careful attention to and control of such process parameters as length of treatment, temperature and the like is therefore necessary to minimize the potential for infusibilizing the fiber. Lower concentrations, for example in the range of from about 5 to about 20 wt. %, preferably from about 10 to about 15 wt. %, will thus be preferred, while high concentrations of nitric acid, particularly above about 20 wt. %, will be less preferred. It will also be known to those skilled in the chemical arts that treatment of carbonaceous materials with highly concentrated oxidizers such as nitric acid carries the risk of producing a rapid, exothermic and possibly sudden or even explosive decomposition of the oxidized materials; hence, excessive concentrations of nitric acid are to be avoided. The liquid oxidizer may be applied to the pitch filaments as they exit the spinnerette prior to being gathered to form pitch fiber or yarn, or after being collected. A variety of methods for applying liquids to continuous fiber are known, including dipping, spraying, misting and the like, as will be readily apparent to those skilled in the art. A rotating kiss wheel, commonly employed for the application of sizing to fibers, may also be conveniently used for this purpose.

Pitch fiber commercially employed for carbon fiber production is ordinarily rendered infusible by being treated in a thermosetting operation such as by heating in an oxidizing gas atmosphere at a temperature in the range of from 200° to 400° C., thus becoming able to withstand considerable working, abrasive contact and thermal exposure during the carbonizing and graphitizing operations without loss of fiber character. Treatment with nitric acid has also been used in producing carbon fiber. These oxidation processes often employ a particulate material such as carbon black or colloidal graphite to separate the pitch filaments and thereby reduce sticking, and surfactants may also be employed to maintain such particles as a uniform dispersion in the aqueous acid composition and aid the flow of the oxidizing composition over the fibers.

To be suitable for the purpose of providing carbon articles according to this invention it is essential that the pitch fiber remain thermoplastic and fusible; that is, the pitch fiber must be capable of undergoing thermoplastic flow and becoming fused when heated. Pitch fiber made infusible by oxidation using any of the thermosetting processes commonly employed in the carbon fiber art will thus generally be unsuited for use in the practice of this invention. It will also be apparent that the particulate materials and surfactants employed in such processes are intended to impede fusion and hence should generally be avoided when treating fiber intended for use in producing carbon articles according to the invention. Thermoset or otherwise infusible pitch fiber will not become fully fused when carbonized and graphitized according to the processes of the invention. The resulting carbonized structure will then comprise fiber poorly-bonded together at the interfaces and will thus be discontinuous and void-filled, low in strength and in bulk density.

The acid-treated fiber may be fed from the spinning operation directly to a fabricating operation for producing a preform as, for example, by weaving or filament winding, or the fiber may be accumulated by winding on a spool or bobbin, placed in a protective wrap, then stored for later fabrication. The wet fiber will contain considerable amounts, even as much as 50 wt. % aqueous acid, preferably from 30 to 45 wt. %, more preferably from 34 to 38 wt. % aqueous acid.

Preform Fabrication

The acid-treated fiber will be fabricated into a preform structure, then carbonized and graphitized. The preform may be formed directly from the fiber while still wet with nitric acid, then directly subjected to the heat treating step. Generally, however, it is preferred to store the acid-wet preform in a protective bag or container for a period of from several hours up to about 14 days, thus providing an aging step whereby the acid may impart an adequate level of stabilization to the fiber surfaces. Although not required for the practice of the invention, such an aging step may be found effective for achieving optimum properties in the final carbon structure.

In the simplest embodiment, multifilament tow or unidirectional pitch fiber tape may be used directly as a preform or, more preferably, a plurality of lengths of tape, yarn or tow may be placed together in parallel relationship to provide a block or brick preform. Alternatively, a suitable preform structure may be formed by conventional filament winding techniques using a continuous pitch fiber in the form of yarn or tow. In a particularly useful embodiment the pitch fiber may be wound on a bobbin or spool to form a cylinder. The cylinder is then sectioned by cutting longitudinally and the cut cylinder is opened to form a flat wafer or tablet comprising pitch fiber aligned substantially in the plane of the tablet. The wafer may if desired be further cut or shaped prior to carrying out the thermal treatment steps. Carbonizing and graphitizing the preform as taught will provide a self-reinforced carbon plate.

In a further alternative embodiment, the cylinder obtained by winding the pitch fiber on a bobbin may be sectioned by slicing along planes perpendicular to the cylinder axis to provide a plurality of toroids or donut-like preforms having pitch fiber distributed circumferentially about the center of the toroid preform in the plane of the preform. It will be apparent that the wound cylinder may also be carbonized and graphitized to provide a cylindrical composite, which then may be sectioned or further trimmed and shaped to provide the desired carbon article. It will be understood that the bobbin employed for the winding operations may take a form other than cylindrical, and may if desired be faceted, thus providing further opportunity for controlling shape and fiber configuration in the final preform structure.

Any of the wide variety of methods well known in the art fabricating carbon fiber may be adapted for use in the practice of this invention. For example, with suitable equipment, wet fiber tow may be formed into a uni-tape or even woven into a cloth or fabric, then formed into structure comprising one or a plurality of layers of such tape or fabric and finally carbonized and graphitized to provide the self-reinforced carbon article.

It will be recognized that the degree of fiber alignment in preform structures may be varied. For example, unidirectional acid-treated pitch fiber tape may be layered in a manner that will provide quasi-isotropic laminate structures. When obtained from a cylinder of wound tow, the fiber alignment in the preform will depend upon the winding angle used in placing the fiber on the bobbin, a low or zero winding angle giving a high degree of fiber alignment and greater winding angles serving to reduce alignment. This feature affords convenient control of fiber alignment in the preform, thereby permitting control of the level of property anisotropy in the resulting carbon article. For example, a ±45° winding angle would provide a structure with quasi-isotropic properties in the fiber plane of the resulting composite, while a 0° wind angle would provide a unidirectional structure having properties maximized along the fiber axis and in the fiber plane. A variety of filament winding techniques are widely used in the art for producing filament-wound structures, and these may also be adapted to provide preform structures from pitch fiber in a wide variety of wound shapes and with selectively determined fiber orientations for use in producing unique self-reinforced carbon articles.

Methods for providing preform structures with even more randomized fiber orientation include the use of felted sheet or mat comprising chopped acid-treated pitch fiber or tow. Felt and mat preforms with volume fractions of from 25 to as great as 80% may be readily produced, the volume fraction of fiber being selectively determined through control of the felting operation and by use of subsequent compacting process steps. Inasmuch as the fiber alignment in such felted structures will in most instances be random, the thermal and mechanical properties of the resulting self-reinforced carbon article may be nearly or even essentially isotropic.

Carbonizing and Graphitizing the Preform

Although the preform may be carbonized and graphitized without further preparation, thermally processing the wet preform will require evaporation of large quantities of water and it may therefore be desirable to allow excess aqueous composition to fully drain from the fiber, and to carry out the initial low temperature heating steps slowly and in stages to permit some drying of the fiber. It will also be seen to be desirable to provide for removal of the moisture during the low temperature heat stages before finally sealing the carbonizing furnace, in order to reduce the potential for furnace blow-out or other furnace damage due to the presence of large quantities of steam. Since the addition of heat cycles increases energy consumption, it may be desirable as an alternative to permit the preform to undergo partial drying at ambient temperatures during the storage period. It will be desirable to exercise some care during the drying and storage to ensure that the wound fiber or preform does not sag.

Substantial consolidation occurs during thermal treatment, causing significant change in volume and introducing the possibility for warping and void formation. It will generally be preferred to provide a fixture or mold to control the final shape and permit the application of external pressure where deemed desirable. Generally, the fixture may take a form as complex as the final shape requires, and will be designed to accommodate the volume change of the preform as it becomes consolidated during the carbonizing and graphitizing processes. The production of a simple graphite plate may require no more than sandwiching between rigid, flat sheets, while matched die molds may be necessary for a structure with complex or multiple-curve surfaces. The fixture may be constructed of any material which will withstand the extreme temperatures employed for the thermal treatment without loss of shape or integrity. Generally, graphite will be the material of choice.

Thermal treatment of the preform may be conducted in a single heating step or in stages to a temperature in the range of 1200°–3500° C. to produce carbonized and graphitized carbon articles of this invention. The heat treatment will be conducted in a substantially non-reactive atmosphere to ensure that the fiber is not consumed. The non-reactive atmosphere may be nitrogen, argon or helium; however, for temperatures above about 2000° C., argon and helium are preferred. Although the non-reactive atmosphere may include a small amount of oxygen without causing serious harm, particularly if the temperature is not raised too rapidly, the presence of oxygen should be avoided. In addition, wet yarn structures will produce an atmosphere of steam when heated, which should be purged from the furnace before carbonizing temperatures are reached inasmuch as steam is highly reactive at such temperatures. It may be desirable to include boron or similar graphitizing components in the furnace atmosphere and these will be regarded as non-reactive as the term is used herein.

The heat treatment used in carbonizing and graphitizing pitch has three broad ranges which are important in deciding a heating schedule. The rate of temperature increase up to about 400° C. should take into account that the pitch fibers will become infusibilized slowly during heating, and may become completely infusibilized when heated above that temperature. Rapid heating may assist softening and fiber deformation due to softening, and cause the fusion and disorientation of the mesophase. While the temperature increase above about 400° C. may take place at a higher rate, it must be recognized that much of the gas loss that occurs during the pyrolysis or carbonizing process takes place as the fibers are heated in the range of 400° C. to about 800° C., and too rapid an increase can result in damage due to evolving gases. Above about 800° C., to the final temperature in the range of 1100°–2000° C. for carbonized structures, and up to 3000° and above for graphitizing, the rate of heating may be much greater, and conducted generally at as rapid a rate as may be desired.

A convenient heating schedule includes heating at an initial rate of 20° C./hr from room temperature to about 400° C., then at 50° C./hr from 400° to 800° C., and finally at a rate of 100° C./hr, or even greater if desired, over the range of from about 800° C. to the final temperature. The heating schedule also is determined in part upon the type of fiber, the size of the preform, the effective loading of the furnace and similar factors. Various further adjustments may be necessary for use of specific equipment and materials, as will also be readily apparent to those skilled in the art.

It will be understood that although the heat treatment has been described as a single step process, the heating of the preform may in the alternative be conducted in a series of steps or stages, with cooling and storage of intermediate materials such as carbonized structures and preforms for further processing at a later time.

Heat treatment of the acid-treated pitch fiber preform may be carried out either without applying external pressure, or with application of a very low external pressure, preferably from about 0.1 to about 10 psi, to assist the compaction and afford high density composites. Higher pressures, and particularly at the extremely high pressures employed for prior art processes such as those described in U.S. Pat. Nos. 4,350,672 and 4,849,200 for producing reinforced carbon composites, causes the acid-treated fiber of this invention to flow excessively, destroying the orientation needed to provide the final carbon article with good mechanical properties and high thermal conductivity.

It will be readily understood by those skilled in the art that the process of this invention will afford the composite manufacturer a high degree of control over part density and the thermal and mechanical properties in the carbon article. The ability to selectively determine the particular combination of fiber treatment, compaction pressures and thermal processing to be employed with respect to the size and geometry of the part that is being produced will afford an effective means for tailoring properties to particular uses. For large parts, such as those having a thickness of from about 0.25 to about 12 inches, where heat conduction into the center of the part, as well as out-gassing from individual pitch filaments, will necessarily be slow, long heating cycles and slow increases in temperature will be desirable, and higher levels of compacting pressure may be preferred to ensure that a good density will be attained throughout the part. For small parts, particularly those having a thin cross-section of as low as 0.05", heating may be carried out more rapidly than for larger parts, but the use of lower levels of applied pressure for compacting may be necessary to avoid distorting the part or causing excessive flow within the fiber structure. Where a low preform density is desired, yet a different balance of applied pressures and heating rates will be needed. Balancing the heating rate against the acid treatment parameters affords yet additional degrees of flexibility in the overall process. It will thus be apparent that the manufacturer of carbon articles will be able to select the particular combination of heating parameters and applied pressures, as well as the degree of acid treatment of the fiber, that will determine the properties obtained in the final carbon article.

The carbon articles of this invention may be characterized in terms of their unique combination of physical and mechanical properties. Solid carbon articles prepared according to the invention with a high degree of fiber alignment may have a bulk density higher than is found in most reinforced carbon composites, generally above about 1.8 g/cc, preferably above about 1.9 g/cc, and often approaching that of single crystal carbon. When measured in the direction of the axis of the filamentous domains, the highly dense, self-reinforced carbon articles may exhibit a thermal conductivity greater than 600 w/m-°K, a tensile strength greater than about 10,000 psi, a tensile modulus above about $70 \times 10^6$ psi and a negative coefficient of thermal expansion, as low as about −0.5 ppm°C.

Although mechanical properties measured in the transverse direction will be considerably lower, articles with transverse tensile strengths greater than 500 psi and a transverse modulus greater than 300,000 psi are readily obtainable by the methods of this invention, while the transverse thermal conductivity will generally be greater than about 40 w/m-°K and may be as great as about 70 w/m-°K or more.

As described hereinabove, control of fiber orientation in the fabrication of the preform may be used to produce carbon articles having lower bulk densities, including high strength, porous carbon articles particularly suited for further processing using infiltration techniques and carbon vapor deposition or infiltration processes to provide unique reinforced carbon structures. These lower bulk density structures will be found on microscopic examination to comprise fully-fused, high-density, highly oriented, high-strength carbon with a high level of open-cell porosity, unlike the low density, reinforced carbon structures of the prior art which are generally made up of carbon fiber, poorly bonded at the points where the fibers are in contact and separated by voids and, where a binder is employed, often including large areas comprising amorphous or low crystallinity carbon. For comparison purposes, commercial high quality bulk graphite materials generally exhibit a much lower bulk density, generally below about 1.6 g/cc, and lower thermal conductivity, ordinarily less than about 185 w/m-°K. Tensile strengths for such materials are on the order of about 10,000 psi, while the tensile modulus is on the order of about 75,000 psi and the coefficient of thermal expansion is high, generally greater than about +0.7 ppm°C. Although highly oriented pyrolytic graphite or HOPG materials may have a bulk density above about 2.0 and a thermal conductivity in the range of 800 w/m-°K, these unreinforced materials are extremely fragile.

The carbon articles of this invention, whether constructed using a high degree of fiber alignment to be dense or structured to have lower densities, will comprise carbon having a unique morphology with two distinct phases: highly-ordered, large, rod-like crystalline graphite domains, separated and reinforced by highly-ordered, filamentous crystalline graphite. More particularly, it appears that within the solid crystalline carbon comprising the article there is a gradual transition in crystalline form, progressing smoothly from regions comprising large, highly-ordered crystalline graphite domains created from the centers of filament, through regions of highly-ordered filamentous crystalline graphite formed from the oxidized pitch layers that comprised the pitch filament surfaces and extending into the interface regions of filamentous crystalline graphite formed by the knitting together of the most oxidized filamentous mesophase domains located at the contacting filament surfaces.

These smooth transitions in crystal form provide a carbon without grain boundaries and discontinuities such as are characteristically found in prior art reinforced carbon composites, together with a high degree of orientation both in the filamentous graphite and in the rod-like crystal graphite domains. The high degree of physical similarity and chemical identity between components effects a uniform and highly efficient reinforcement of the final graphitic carbon structure, significantly improving toughness. The uniformity of structure and small crystallite morphology, on the order of about 10 microns for the large, highly-ordered crystalline domains, also imparts a high degree of machinability, as well as high tolerance to repetitive temperature cycling.

The preforms are constructed of mesophase pitch fiber. As is known in the art, mesophase or liquid crystal pitch may be readily oriented through use of mechanical operations such as melt-spinning. Such processes are used commercially for spinning filaments comprising continuous, highly-oriented filamentous mesophase pitch domains aligned with the fiber axis. When the oriented liquid crystal pitch is thermally converted into crystalline carbon, the orientation is retained to provide, in the case of fiber, carbon fiber comprising highly oriented, filamentous crystalline carbon.

When treated with liquid oxidizer such as nitric acid, the surfaces of the mesophase pitch filament are altered, providing a filament structure comprising outer layers of oxidized filamentous mesophase domains surrounding a core of substantially unoxidized filamentous mesophase pitch. The level of oxidation and the degree of penetration into the interior of the filament will be determined in part by the oxidizer concentration and the time of exposure, and the filamentous mesophase domains comprising the surfaces of the filament will thus have the highest level of oxidation, while the oxidation levels in the underlying layers of filamentous mesophase will be progressively reduced with distance from the surface. While not intending to be bound by any particular theory of operation, it appears from microscopic examination of the invented carbon articles that during thermal treatment to carbonize and graphitize the preform structure, the pitch filaments initially become deformed radially, flowing to some extent to reduce the void space within the structure and increase the area of contact between filament surfaces. As the pyrolysis, carbonizing and graphitizing of the liquid crystal pitch progresses, the highly-oriented, filamentous mesophase pitch domains comprising the core of the filament appear to undergo some re-crystallization, losing the filamentous character and forming larger crystalline graphite domains while retaining crystal orientation. At the filament surface, the filamentous mesophase domains, oxidized to varying degrees depending on location relative to the surface, appear to form filamentous crystalline carbon domains while becoming more completely adhered or knitted at the contacting surfaces, thus forming a continuous network that extends through and reinforces the carbon structure.

Filled and reinforced composite materials of the prior art, particularly including bulk graphite and carbon fiber-reinforced carbon composites, comprise matrix and discontinuous reinforcement phases embedded in a matrix phase. The phases will differ greatly in crystallinity and often in chemical composition, and thus are highly dissimilar with sharp discontinuities occurring at the phase boundaries as well as at the grain boundaries within their crystalline components. The discontinuities act as flaws, acting to concentrate stress and reduce the strength of the composites and, together with a significant level of amorphous or semi-crystalline character in the matrix component, may further reduce composite density and limit bulk thermal conductivity. In addition, and particularly for prior art composites formed by consolidation of fully oxidiated pitch or PAN fiber, the fiber components are adhered with a much lower efficiency and the bonding often fails. Such composites are then difficult to machine, often splintering along fiber interfaces and grain boundaries.

The invention will be better understood by consideration of the following illustrative examples which are provided to illustrate methods for the preparation of self-reinforced carbon articles as specific embodiments of the invention and are not intended in any way to limit the scope thereof.

EXAMPLES

The test methods employed in the following examples for mechanical properties for carbon structures are described in ASTM D4018 and D3800. Methods for measurement of thermal conductivity of carbon structures are well-known in the literature. The determinations reported in the following examples were made at room temperature, as follows:

Nominal 1"×3" or larger carbon panels are employed for the determinations. Thermal foil strip heaters generating a power density of 100 KW/m$^2$ are attached to an end of the panel, using thermally conductive grease to assure good contact. Platinum-resistive temperature devices are then adhered to the panel at measured distances, again with thermally-conductive grease, and the panel is then clamped in a heat sink at the end opposite the strip heater and maintained at a constant 15° C. by immersion in recirculating liquid. The device is heavily insulated to minimize heat loss from the system by radiation. Measurements of power/heat input and temperature differential along multiple paths and the determination of cross-sectional heat flow are made when steady-state conditions are established. Calibration of the device is made using aluminum or copper panels of known thermal conductivity.

Thermal conductivity is calculated using the Fourier Conduction Law $$q = KA \left[ \frac{\Delta T}{\Delta X} \right]$$

where q=power input; A=cross-sectional area; K=thermal conductivity; ΔT=temperature differential between resistive thermal devices in the direction of thermal flow; and ΔX=distance between temperature measurement devices. The data are reported in W/m-°K.

As will be seen from the following examples, a variety of medium-to-low bulk density carbon preforms may be produced by the processes according to this invention. Such preforms will comprise highly-oriented carbon, together with good porosity desirable for use in impregnation and carbon vapor infiltration or deposition processes.

Example 1

Pitch fiber yarn having 2000 filaments was spun from a 344.7° C. softening point, 100% mesophase pitch, using an average temperature of 405° C. The fiber was spun at an extrusion rate of 12 lb/hr, and aqueous nitric acid (13 wt. %) sizing solution was applied to the fiber during the spinning operation using a kiss wheel. The fiber was precision-wound using a traverse rate of 1.64" per revolution, onto a 4" diameter core with a winding length of 8". The final 8 lb. spool or package of fiber contained 35 wt. % sizing solution.

The package was sectioned by cutting lengthwise to the core, opened and, after the core was removed, was pressed flat and edge-trimmed to provide a 8"×12" fiber mat having a thickness of 2". The mat was sandwiched between foils, bagged in polyethylene and stored for three days, then fixtured between two graphite plates with sufficient added weight to provide a compaction pressure of 1.12 psi. The fixtured mat was placed in an induction furnace and graphitized by heating in an argon atmosphere at a rate of 25°/hr to 25° C., then 15°/hr to 400° C., then at 50°/hr to 800° C., and finally at 100°/hr to 3280° C. The graphitized mat was held or two hours, then cooled and removed from the fixture, providing a graphite brick measuring 0.93"×7.9"×11.4" weighing 3.0 lb.

The brick was non-uniform, with regions of high density carbon and areas of lower consolidation. Test specimens were cut from various portions of the brick representing a range of densities; the range of mechanical properties observed reflects those structural differences within the brick. The properties measured for the graphite brick are summarized in Table I.

TABLE I

| Property | | Range | | |
|---|---|---|---|---|
| | | Average | Minimum | Maximum |
| Bulk Density | (g/cc) | 1.6 | 1.4 | 2.0 |
| Fiber Vol. Fraction | (%) | 0.7 | 0.64 | 0.89 |
| Thermal Conductivity[1] | | | | |
| X-direction | (W/m-°K) | 627 | 459 | 849 |
| Y, Z directions | (W/m-°K) | 53 | 43.4 | 56 |
| Coeff. of Thermal Expansion[2] | | | | |
| X-direction | (ppm/°C.) | −0.54 | | |
| Y, Z directions | (ppm/°C.) | 8.1, 8.64 | | |
| Tensile Modulus | | | | |
| 0° | (Kpsi) | | 49,700 | 80,900 |
| 90° | (Kpsi) | | 380 | 1,900 |
| Tensile Strength | | | | |
| 0° | (psi) | 15,750 | 15,500 | 16,000 |
| 90° | (psi) | | 390 | 600 |
| Compressive Modulus[3] | (Mpsi) | 54.6 | 53.9 | 56.3 |
| Compressive Strength[3] | (Mpsi) | 10.4 | 8.5 | 12.1 |

Notes:
[1]Average of 10 specimens;
[2]Single determination;
[3]Average of 4 specimens.
X, Y and Z denote the orthogonal axes within the brick, the X axis being the nominal fiber axis; 0° tensile tests were determined along the nominal fiber axis; 90° tests were determined in the plane perpendicular to nominal fiber axis.

Microscopic examination found some buckling in the alignment; the variance in the X and Y directions averaged about ±4.8°, and in the Z direction about ±2.5°. Deviations as great as ±25_ were found in some areas of the brick. Gaseous voids having an average size of 0.015 mm and ranging up to 0.35 mm were also present. The density of individual graphitic domains comprising the solid carbon areas of the brick was determined at the microscopic level by nitrogen pycnometer and found to be 2.225 g/cc.

The high density solid carbon specimens had a specific modulus of 11×10⁸ inches.

Example 2

Mat was prepared from pitch fiber yarn substantially according to the procedures of Example 1 and stored for period of 35 days before processing, fixtured at a compaction pressure of 1.34 psi and graphitized in an induction furnace by heating in an argon atmosphere at a rate of 100°/hr to 800° C., then at 200°/hr to 3295° C. The graphitized mat was held at 3295° C. for two hours, then cooled and removed from the fixture, providing a graphite brick measuring 1.48"×6.3"×11.4", weighing 3.84 lb. The brick exhibited some longitudinal cracking.

The graphite brick had an average bulk density of 1.223 g/cc. Examination by optical means and by scanning electron micrography again showed solid carbon regions comprising a filamentous crystalline graphite structure reinforcement and larger, rod-like crystalline graphite domains, having an estimated 100% volume fraction of graphite. Regions of lesser degrees of consolidation, estimated as comprising 60% volume fraction of the solid carbon component, were also present.

Example 3

Pitch fiber yarn having 2000 filaments was spun from a 349° C. softening point, 100% mesophase pitch, using an average temperature of 412° C. The fiber was spun at an extrusion rate of 12 lb/hr, and aqueous nitric acid (10 wt. %) sizing solution was applied to the fiber during the spinning operation using a kiss wheel. The fiber was precision-wound using a traverse rate of 1.64" per revolution, onto 4" diameter cores. Two 4 lb. spools or packages of fiber were produced containing 35 wt. % sizing solution.

The packages were sectioned by cutting lengthwise to the core, opened and, after the core was 30 removed, pressed flat to provide fiber mats. The mats were trimmed to form 6"×6" mats, lined with Grafoil and then bagged, fixtured and stored for three days. The fixtured mats, with a compaction pressure of 0.19 psi, were placed in an induction furnace and carbonized by heating in an argon atmosphere at a rate of 25°/hr to 400° C., then at 50°/hr to 800° C., and finally at 100°/hr to 1300° C. and held at temperature for two hours. The carbonized mats were then cooled and removed from the fixtures. The carbon preforms had bulk densities of from 1.09–1.31 g/cc, were highly handleable and friability was limited to a few extreme edge and surface rows.

Example 4

Six 1 lb. spools of pitch fiber yarn were produced substantially according to the procedures of Example 1 but using 12.5 wt. % aqueous nitric acid sizing solution, then cut as before to form mat. The six mats, wet with acid, were then plied in a stack to provide a [0°/+60°/−60°]s mat orientation, measured relative to the nominal 0° mat fiber axis. The stack was bagged and stored for three days, then fixtured between graphite plates at a compaction pressure of 0.4 psi. The fixtured stack was placed in an induction furnace and carbonized by heating in an argon atmosphere at a rate of 25°/hr to 400° C., then at 50°/hr to 800° C., and finally at 100°/hr to 1300° C. and held at temperature for two hours before being cooled and removed from the fixture. The mats in the stack were examined and found to vary in density from 0.84 to 1.25 g/cc. The mat with greatest density was well-adhered, forming a carbon structure measuring 0.22"× 7"×7", weighing 0.49 lb. and having a 1.0 g/cc bulk density.

When infiltrated with carbon by a single chemical vapor deposition (CVD) cycle, the resulting carbon block had a bulk density of 1.95 g/cc. Prior art carbon preforms intended for CVD processing exhibit a much lower porosity, achieving bulk densities on the order of 1.8 g/cc even when subjected to multiple CVD infiltration cycles.

Example 5

Acid-wet mat prepared and stored for aging substantially as in Example 4 was re-shaped by stretching to provide an approximate fiber orientation of ±30° relative to the original mat fiber axis. The mat was fixtured and carbonized at a compaction pressure of 0.4 psi and then carbonized as in Example 4, providing a pliable mat preform having a bulk density of 0.63 g/cc.

It will thus be seen that the processes taught herein readily provide both graphitized and carbonized articles, over a wide range of bulk densities. Low density carbonized articles are seen to possess an unusually high level of porosity, which permits use of carbon infiltration by CVD processes to provide carbon composites with a very high carbon content.

Porous carbonized structures are highly desired by the industry for use as preforms in manufacturing carbon articles by such production processes. The production of such carbon preforms will require careful attention to process details including acid content and consolidation pressures as well as to design factors such as fiber content. As will be apparent from the following Comparison Example A, mat having a low fiber volume-fraction may not become adequately bonded in the carbonizing step. The resulting carbon structure may then be brittle, unable to withstand handling and thermal cycling.

Comparison Example A

Pitch fiber yarn having 2000 filaments was spun from a 346° C. softening point, 100% mesophase pitch, using an average temperature of 410° C. The fiber was spun at an extrusion rate of 12 lb/hr, and aqueous nitric acid (12 wt %) sizing solution was applied to the fiber during the spinning operation using a kiss wheel. The fiber was precision-wound using a traverse rate of 1.64" per revolution, onto 4" diameter cores. Four 8 lb. spools or packages of fiber were produced containing 40 wt. % sizing solution.

The packages were sectioned by cutting lengthwise to the core, opened and, after the core was removed, pressed flat to provide fiber mats. The mats were then reshaped by stretching and plying to obtain a nominal ±35° tow orientation, trimmed to form 6"×6" mats and then bagged, fixtured without compaction pressure and stored for three days. The fixtured mats were placed in an induction furnace, weighted to a compaction pressure of 0.62 psi and carbonized by heating in an argon atmosphere at a rate of 25°/hr to 400° C., then at 50°/hr to 800° C., and finally at 100°/hr to 1300° C. and held at temperature for two hours. The carbonized mats were then cooled and removed from the fixtures. The carbon preforms had bulk densities of from 0.59–0.72 g/cc, were friable when handled roughly, and delaminated during thermal cycling when subjected to carbon infiltration by CVD.

The method of this invention may be used to provide carbon preforms from randomly-oriented fiber with good porosity for use in CVD processes, as shown in the following examples.

Example 6

Pitch fiber yarn having 2000 filaments was spun from a 345° C. softening point, 100% mesophase pitch, using an average temperature of 406° C. The fiber was spun at an extrusion rate of 12 lb/hr, and aqueous nitric acid (13 wt. %) sizing solution was applied to the fiber during the spinning operation using a kiss wheel to provide fiber with a take-up of 36 wt. %. The fiber was collected loosely as randomly configured mats. Two mats were formed into 2 lb., 7" diameter, 4" long cylinders of randomly oriented fiber, stacked with a Grafoil separator and fixtured with a caul plate at a compaction pressure of 0.52 psi. The stack was carbonized substantially by the process used in Example 6 to provide carbon preforms having bulk densities of 0.509 and 0.556 g/cc. Infiltration with carbon was carried out by CVD processing without delamination during thermal cycling, resulting in a carbon structure having a bulk density of 1.8 g/cc.

Example 7

Two acid-wet cylinders were prepared, stacked and fixtured for thermal treatment substantially as in Example 6, but with a compaction pressure of 0.46 psi. The stack was graphitized substantially by the process used in Example 1 to provide graphitized preforms having bulk densities of 0.666 and 0.676 g/cc. Infiltration with carbon was carried out by CVD processing without delamination during thermal cycling, resulting in a carbon structure having a bulk density of 1.84 g/cc.

Suitable mat for constructing preforms may also be made having random fiber orientation by using discontinuous pitch fiber, for example by using chopped fiber. In the following example, acid-treated, continuous fiber mat is chopped and fluffed to provide random fiber which is shaped into a loose fiber mat and the mat is then formed into a pitch fiber preform and carbonized.

Example 8

Pitch fiber yarn having 2000 filaments was spun from 100% mesophase pitch and treated with aqueous nitric acid (13 wt. %) sizing solution, applied to the fiber during the spinning operation using a kiss wheel to provide fiber with a take-up of approximately 36 wt. %. The fiber was wound on a bobbin to form the package using approximately 5° winding angle, and the package was then cut, opened and, after removing the core, pressed flat to provide a fiber mat. The acid-wet mat was bagged, stored at room temperature for 48 hours, then dried overnight at 110° C. using a nitrogen purge to minimize oxidation. The mat was cut into 3 inch pieces, then into ⅛ to ¼ inch lengths which then were fluffed to separate and disperse the short, chopped fiber, giving a mass of randomly oriented pitch filaments. The mass of fibers was shaped by placing in a 4.5"×4.5" die mold and lightly pressing to give a uniform mat of fiber. The fiber mat was compacted by pressing using 75 psi pressure and holding at 320° C. for 35 min, giving on cooling a compacted, randomly oriented pitch fiber preform having a 0.32 cm thickness and a density of 0.962 g/cc, corresponding to a fiber volume fraction Vf of approximately 0.70. After carbonizing by heating to a maximum temperature of 1000° C. using a 58.5 hr heating schedule, the random fiber preform had a thickness of 0.22 cm at a measured density of 1.13 g/cc, corresponding to a Vf of 0.60.

Wound cylindrical preforms with fiber oriented along the circumference of the cylinder may also be produced, as shown by the following Example 8.

Example 9

Pitch fiber yarn having 2000 filaments was spun from a 348° C. softening point, 100% mesophase pitch, using an average temperature of 410° C. The fiber was spun at an extrusion rate of 12 lb/hr, and aqueous nitric acid (12 wt. %) sizing solution was applied to the fiber during the spinning operation using a kiss wheel. The fiber was precision-wound using a traverse rate of 1.64" per revolution, onto 4" diameter cores. After removing the core, the 6 lb. fiber cylinder containing approximately 41 wt % sizing solution was graphitized according to the schedule employed in Example 3, giving a cylinder preform having a bulk density of 0.73 g/cc, with two distinct density regions due to nonuniform compaction during the carbonizing cycle. When transversely sectioned, the most compacted ring had a bulk density of 1.04 g/cc.

Comparison Example B

A 4 lb. spool of pitch fiber was prepared substantially as in Example 9 but using a 8 wt. % aqueous nitric acid sizing solution. The fiber cylinder containing approximately 40 wt. % sizing solution was carbonized following the heat schedule employed for Example 5. The preform melted in the center, destroying the cylinder shape with complete loss of fiber orientation.

It will be seen that treatment with very low levels of acid for short periods of time does not infusibilize the fiber surface efficiently for use in the process of the invention.

Example 10

Pitch fiber yarn having 2000 filaments was spun from a 345° C. softening point, 100% mesophase pitch, using an average temperature of 414° C. The fiber was spun at an extrusion rate of 12 lb/hr and aqueous nitric acid (12.5 wt. %) sizing solution was applied to the fiber during the spinning operation using a kiss wheel. The fiber was precision wound using a traverse rate of 0.125" per revolution, onto 4" diameter cores. The 6 lb. spool of fiber contained 39.5 wt. % sizing solution.

The package was cut lengthwise to the core, opened and, after the core was removed, was pressed flat and edge-trimmed to provide a 7"×7.5" fiber mat having a thickness of 1.57". The mat was sandwiched between foils, bagged in polyethylene and stored for two days, then fixtured between two graphite plates with sufficient added weight to provide a compaction pressure of 1.86 psi. The fixtured mat was placed in an induction furnace and graphitizied by heating in an argon atmosphere at a rate of 25°/hr to 400° C., then at 50°/hr to 800° C., 100° C. to 1800° C. and finally at 200°/hr to 3253° C. The graphitized mat was held at 3253° C. for two hours, then cooled and removed from the fixture, providing a graphite brick measuring 0.16"×5.6"×11.5", weighing 307 g. The graphite brick had a thermal conductivity of 600 W/m-°K.

The graphitized brick of Example 10 was re-fired to a final graphitizing temperature of 3305° C., providing a graphite brick having a thermal conductivity of 800 W/m-°K.

Example 11

A graphitizied brick was prepared substantially as in Example 10, but using a final graphitizing temperature of 3253° C. The graphite brick had the following physical properties:

TABLE 2

| Property | | Ave | n |
|---|---|---|---|
| Tensile Strength | | | |
| 0° | psi | 14,700 | 2 |
| 90° | psi | 300 | 2 |
| Tensile Modulus | | | |
| 0° | Kpsi | 53,900 | 2 |
| 90° | Kpsi | 300 | 2 |
| Compressive Strength | | | |
| 0° | psi | 21,300 | 5 |
| Compressive Modulus | | | |
| 0° | Kpsi | 52,700 | 1 |
| In-Plane Shear Strength | psi | 1,700 | 2 |
| In-Plane Shear Modulus | Kpsi | 1,200 | 3 |
| bulk density | g/cc | 1.81 | |

The following Examples illustrate the effects of processing parameters such as acid content and thermal cycle and bulk size on product properties.

Example 12

Pitch fiber yarn having 2000 filaments was spun from a 345° C. softening point, 100% mesophase pitch, using an average temperature of 409° C. The fiber was spun at an extrusion rate of 12 lb/hr and aqueous nitric acid (12.5 wt %) sizing solution was applied to the fiber during the spinning operation using a kiss wheel. The fiber was precision-wound using a traverse rate of 0.125" per revolution, onto 4" diameter cores. The 6 lb. spool of fiber contained 32.4 wt. % sizing solution.

The package was cut lengthwise to the core, opened and, after the core was removed, was pressed flat and edge-trimmed to provide a 7"×7.5" fiber mat having a thickness of 1.57". The mat was sandwiched between foils, bagged in polyethylene and stored for two days, then fixtured between two graphite plates with sufficient added weight to provide a compaction pressure of 1.07 psi. The fixtured mat was placed in an induction furnace and graphitized by heating in an argon atmosphere at a rate of 25°/hr to 400° C., then at 50°/hr to 800° C., 100° C. to 1800° C. and finally at 200°/hr to 3253° C. The graphitized mat was held at 3253° C. for two hours, then cooled and removed from the fixture, providing a 1425 g graphite brick that had melted and foamed at the center, losing all fiber orientation and shape.

A smaller mat prepared and thermally processed by substantially the same procedures provided a 307 g brick without melting or loss of fiber orientation. Thermal processing of large articles thus requires careful control of heat cycles to avoid melting.

Example 13

Pitch fiber yarn having 2000 filaments was spun from a 341° C. softening point, 100% mesophase pitch, using an average temperature of 415° C. The fiber was spun at an extrusion rate of 12 lb/hr and aqueous nitric acid (13 wt. %) sizing solution was applied to the fiber during the spinning operation using a kiss wheel. The fiber was precision-wound using a traverse rate of 0.125" per revolution, onto 5" diameter cores. The 1.5 lb. spool of fiber contained 32.4 wt. % sizing solution.

The package was cut lengthwise to the core, opened and, after the core was removed, was pressed flat and edge-trimmed to provide a 6.25"×7" fiber mat having a thickness of 0.4". The mat was sandwiched between foils, bagged in polyethylene and stored for two days, then fixtured between two graphite plates with sufficient added weight to provide a compaction pressure of 1.89 psi. The fixtured mat was placed in an induction furnace and graphitized by heating in an argon atmosphere at a rate of 25°/hr to 300° C., then at 40°/hr to 500° C., then at 50°/hr to 800° C., 100° C. to 1800° C. and finally at 200°/hr to 3295° C. The graphitized mat was held at 3295° C. for two hours, then cooled and removed from the fixture, providing a graphite brick that had slight melting, strong integrity and a bulk density of 1.87 g/cc.

Comparison Example C

A graphitized brick was prepared substantially as in Example 13, but using a 3 lb. winding and an acid pickup of 34.5 wt. %. The graphitized brick was melted and had lost all fiber orientation and shape, again demonstrating the importance of control of thermal cycle for larger articles.

Comparison Example D

A graphitized brick was prepared substantially as in Comparison Example C, but using a 3 lb. winding, an aqueous nitric acid concentration of 16 wt. % and an acid pickup of 35.5 wt. %. The resulting brick was unmelted and only lightly bonded, with a bulk density of 1.46 g/cc. It will be apparent that the use of high levels of acid may too completely infusibilize the fiber surface, preventing the necessary degree of flow during thermal processing.

Example 14

Pitch fiber yarn having 2000 filaments was spun from a 341° C. softening point, 100% mesophase pitch, using an average temperature of 411° C. The fiber was spun at an extrusion rate of 12 lb/hr and aqueous nitric acid (13 wt. %) sizing solution was applied to the fiber during the spinning operation using a kiss wheel. The fiber was precision-wound using a traverse rate of 0.125" per revolution, onto 5" diameter cores. The 1.5 lb. spool of fiber contained 36.3 wt. % sizing solution.

The package was cut lengthwise to the core, opened and, after the core was removed, was pressed flat and edge-trimmed to provide a 9"×7" fiber mat having a thickness of 0.4". The mat was sandwiched between foils, bagged in polyethylene and stored for two days, then fixtured between two graphite plates with sufficient added weight to provide a compaction pressure of 2.04 psi. The fixtured mat was placed in an induction furnace and graphitized by heating in an argon atmosphere at a rate of 25°/hr to 200° C., then at 12.5°/hr to 300° C., then at 20°/hr to 500° C., then at 50°/hr to 800° C., 100° C. to 1300° C. and finally at 200°/hr to 3280° C. The graphitized mat was held at 3280° C. for two hours, then cooled and removed from the fixture, providing a graphite brick that had slight melting, strong integrity and a bulk density of 1.80 g/cc. The graphite brick had bulk density of 1.8 g/cc and a thermal conductivity of 746 W/m-°K.

Example 15

Pitch fiber yarn having 2000 filaments was spun from a 341° C. softening point, 100% mesophase pitch, using an average temperature of 411° C. The fiber was spun at an extrusion rate of 6 lb/hr and aqueous nitric acid (13 wt. %) sizing solution was applied to the fiber during the spinning operation using a kiss wheel. The fiber was wound with a reciprocating motion using a traverse rate of 0.125" per revolution with superimposed ±5° wind angle, onto 5" diameter cores. The 1.5 lb. fiber package contained 46.3 wt. % sizing solution.

The package formed into a mat, bagged, fixtured and graphitized as in Example 18 but with a compaction pressure of 1.71 psi to provide a solid graphitized brick having bulk density of 1.33 g/cc and exhibiting gross porosity created by the overlap of windings.

Example 16

Pitch fiber yarn having 2000 filaments was spun from a 345° C. softening point, 100% mesophase pitch, using an average temperature of 405° C. The fiber was spun at an extrusion rate of 12 lb/hr and aqueous nitric acid (13 wt. %) sizing solution was applied to the fiber during the spinning operation using a kiss wheel. The fiber was precision-wound using a traverse rate of 0.125" per revolution, onto 5" diameter cores. The 4 lb. spool of fiber contained 32.4 wt. % sizing solution.

The package was cut lengthwise to the core, opened and, after the core was removed, was pressed flat and edge-trimmed to provide a 6"×6" fiber mat having a thickness of 0.827". The mat was sandwiched between foils, then placed in a vacuum oven and dried at 50° C. and 28" pressure for 72 hr. The dried mat was then fixtured between two graphite plates with sufficient added weight to provide a compaction pressure of 8 psi. The fixtured mat was placed in an induction furnace and graphitized by heating in an argon atmosphere at a rate of 25°/hr to 400° C., then at 50°/hr to 800° C., and finally at 200°/hr to 3133° C. The graphitized mat was held at 3133° C. for two hours, then cooled and removed from the fixture, providing a graphite brick with a bulk density of 1.67 g/cc and excellent integrity.

Acid-treated pitch fiber yarn may also be used in the production of highly desirable carbon and graphite fiber, as will be readily seen from the following Comparison Example.

Comparison Example E

Pitch fiber yarn having 2000 filaments was spun from a 355° C. softening point mesophase pitch, using an average temperature of 412° C. The fiber was spun at an extrusion rate of 12 lb/hr and 850 ft/min to provide a total fiber weight of 3.8 lb. A mixture containing aqueous nitric acid (25 wt. %) and 35 g/l of carbon black was applied to the fiber during the spinning operation using a kiss wheel. The fiber was wound at a low crossing angle onto a graphite bobbin covered with a ¼" thick carbon felt pad to give a diameter of 3.5". The final spool or package of fiber was tapered, 10" at the base and 4" at the top, and had an outside diameter of 6.5". The final weight of the pitch fiber package included 38 wt. % aqueous acid mixture.

The package was mechanically rotated and allowed to dry at room temperature to a moisture content of about 15 wt. %, and then further to a final moisture content of less than 9 wt. %. The package was placed in the induction furnace and heated in a nitrogen atmosphere at a rate of 25°/hr to 400° C., then at 50°/hr to 800° C., then to 1300° C. and held for 24 hr. before being cooled, removed from the furnace and placed in a second induction furnace. The package was again heated in an argon atmosphere at 100°/hr to 3230° C., held at 3230° C. for 2 hr. then cooled. The filaments had not fused to form a solid carbon preform. The fiber, readily unwound in the form of a continuous yarn, had a tensile strength of 453,000 psi, a tensile modulus of 136,000,000 psi. yield of 0.355 g/m, density of 2.21 g/cc and a resistivity of 1.14 micro-ohm-meter.

It will thus be seen that pitch fiber completely infusibilized by a treatment using a high concentration of nitric acid in combination with a carbon black particulate additive intended to further assist in preventing fusion of the filaments according to processes taught in the art for the production of carbon fiber, is not fused or formed into solid carbon when pyrolyzed and then carbonized.

Specific conductivity was calculated from data for thermal conductivity measurements made for a series of substantially anisotropic carbon specimens having a range of bulk densities. The specific conductivity data are summarized in the following Table 3.

TABLE 3

Specific Conductivity for Carbon Articles

| bulk density g/cc | Specific Conductivity | | |
|---|---|---|---|
| | fiber axis direction W-cm$^2$/°K-g | transverse direction W-cm$^2$/°K-g | volumetric W-cm$^2$/°K-g |
| 1.99 | 4.27 | 0.28 | 4.83 |
| 1.9 | 4.21 | — | — |
| 1.89 | 4.09 | — | — |
| 1.86 | 4.30 | — | — |
| 1.85 | 3.92 | — | — |
| 1.8 | 4.15 | — | — |
| 1.79 | 4.17 | — | — |
| 1.76 | 3.84 | 0.25 | 4.33 |
| 1.68 | 4.21 | — | — |
| 1.67 | 3.44 | — | — |
| 1.51 | 4.81 | — | — |
| 1.43 | 3.32 | — | — |

Volumetric specific conductivity may be characterized as representing the overall thermal conductivity value for a unit volume of the graphite structure, and is determined as the sum of the thermal conductivities in the three orthogonal axes divided by the bulk density.

For comparison purposes, bulk graphite structures having densities in the range of from 1.6–1.8 g/cc generally exhibit a specific conductivity of less than about 1.1 W-cm$^2$/°K-g, generally from about 0.6–1.1 W-cm$^2$/°K-g, together with a volumetric value less than about 2.6 W-cm$^2$/°K-g. Carbons having an even lower level of crystalline character are known having a 10 specific conductivity below about 0.2 W-cm$^2$/°K-g and a volumetric value of less than about 0.5 W-cm$^2$/°K-g. For bulk graphite structures lacking substantial orientation, thermal conductivity varies little with direction of measurement.

The specific conductivity of the final structure will be affected by the structural uniformity within the carbon component. As seen from the data presented in Table 3, the specific conductivity for articles with densities above about 1.5 g/cc falls within a rather narrow range, indicating a high degree of uniformity within the crystalline component. The variability in axially-measured specific conductivity demonstrates the increasing difficulty of achieving uniform consolidation and uniform crystallinity within the carbon component with good reproducibility as density decreases, and it will be seen that good control of process parameters becomes important.

Carbon articles constructed according to this invention to be anisotropic in character will, over a range of densities, thus generally have a specific conductivity greater than about 4.0 W-cm$^2$/°K-g when measured in the direction of the nominal fiber axis, and greater than about 0.20 W-cm$^2$/°K-g when measured transversely, together with a volumetric specific conductivity greater than about 4 W-cm$^2$°K-g, preferably from about 4 to about 5 W-cm$^2$/°K-g.

It will thus be seen that the present invention is a method for making a carbon article comprising the steps of providing a mat comprising pitch fiber, forming the mat into a preform, and carbonizing the preform. The pitch-based carbon articles may be described as having, in combination, a density of not less than 1.8 g/cc, a thermal conductivity greater than 50 w/m-°K, a modulus greater than 300.000 psi, a tensile strength greater than 500 psi. Preferably, the carbon will have a density of not less than 1.8 g/cc together with an anisotropic distribution of mechanical properties including, in combination, a thermal conductivity greater than 600 w/m-°K, a tensile strength greater than 10,000 psi, a modulus above 70×10$^6$ psi and an axial coefficient of thermal expansion of less than about –0.5 ppm/°C. Still more preferably, the carbon will have a density in the range of from about 2.18 g/cc to the limiting density of crystalline graphite, about 2.26 g/cc, and an anisotropic distribution of mechanical and thermal properties including, in combination, a thermal conductivity greater than 700 w/m-°K, a tensile strength greater than 15,000 psi, a modulus greater than 80×10$^6$ psi and an axial coefficient of thermal expansion of less than 0 ppm/°C., preferably from about –0.5 ppm/°C. to about –1.6 ppm/°C. The invented carbon may be further described and characterized in terms of a unique morphology comprising two distinct phases—highly-ordered, large, rod-like crystalline graphite domains, separated and reinforced by highly-ordered, filamentous crystalline graphite.

It will be readily understood by those skilled in the art that articles comprising the invented carbon may, if desired, be constructed to have varying degrees of porosity or with areas of low consolidation, thus providing articles having a bulk density lower than that of the solid carbon. In addition, by lowering fiber alignment in the construction of the article, the set of mechanical and thermal properties for the article may be selected to lie in a range of values intermediate between those measured with fiber alignment for highly-oriented solid carbon and the correspondingly transversely measured property values. The present invention is thus further characterized as being directed to methods for making such carbon articles as well as to the intermediate pitch fiber and preforms useful in the production of self-reinforced carbon articles.

It will be recognized by those skilled in the art that further modifications, particularly in the processes described for making the pitch-based self-reinforced carbon articles of this invention, may be made without departing from the spirit and scope of the invention, which is solely defined by the appended claims.

We claim:

1. A method for the preparation of a carbon article consisting of fused, mesophase pitch-based carbon fiber and having a thermal conductivity greater than 50 w/m-°K, a modulus greater than 300.000 psi , a tensile strength greater than 500 psi, and a density greater than 1.8 g/cc, said articles consisting of fused, mesophase pitch-based carbon fiber, said method comprising the steps of:

(a) providing a mesophase pitch fiber mat, said mat comprising aqueous nitric acid and thermoplastic, fusible pitch fiber selected from the group consisting of felted pitch fiber and continuous pitch fiber;

(b) fabricating a preform structure from said mesophase pitch fiber mat; and (c) carbonizing said preform structure by a thermal treatment conducted in a substantially inert gas atmosphere to a final temperature in a range of from about 3000° to about 3500° C. thereby forming said carbon article.

2. The method of claim 1 wherein said mesophase pitch fiber mat comprises randomly oriented pitch fiber.

3. The method of claim 1 wherein the thermal treatment is conducted by heating said preform in a first heating step to a first temperature in a range of from about 1000° to about 1600° C. and then in a subsequent step to a final temperature in a range of from about 3000° to about 3500° C.

4. The method of claim 1 wherein said preform is, subjected to a compaction pressure in the range 0.1 to 10 psi when conducting said thermal treatment.

5. The method of claim 1 wherein said aqueous nitric acid comprises from about 5 to about 20 wt % nitric acid.

6. The method of claim 1 wherein said mat comprises from about 30 to about 45 wt % aqueous nitric acid.

* * * * *

UNITED STATES PATENT AND TRADEMARK OFFICE
CERTIFICATE OF CORRECTION

PATENT NO.: 5,750,058

DATED: May 12, 1998

INVENTOR(S): Daniel H. Hecht, David A. Schulz

It is certified that error appears in the above-identified patent and that said Letters Patent is hereby corrected as shown below:

| Col. | Line |   |
|------|------|---|
| 13 | 16 | reads "to 25°C.,"<br>should read --to 250°C.,-- |
| 13 | 18 | reads "held or two hours,"<br>should read -- held at 3280°C for two hours-- |
| 14 | 37 | reads "after the core was 30 removed"<br>should read --after the core was removed-- |
| 24 | 3 | reads "wherein said preform is,"<br>should read --wherein said preform is-- |

Signed and Sealed this

Fifth Day of January, 1999

Attest:

Attesting Officer

Acting Commissioner of Patents and Trademarks